(12) United States Patent
Khandekar et al.

(10) Patent No.: US 9,796,917 B2
(45) Date of Patent: Oct. 24, 2017

(54) HYDROCARBON FLUID FLOW IMPROVER

(75) Inventors: Chandrashekhar Yeshwant Khandekar, Katy, TX (US); Tore Nordvik, Sadnes (NO); Anders Grinrod, Sadnes (NO)

(73) Assignees: M-I L.L.C., Houston, TX (US); SCHLUMBERGER NORGE AS, Hafrsfjord (NO)

( * ) Notice: Subject to any disclaimer, the term of this patent is extended or adjusted under 35 U.S.C. 154(b) by 743 days.

(21) Appl. No.: 14/236,050

(22) PCT Filed: Jul. 30, 2012

(86) PCT No.: PCT/US2012/048786
§ 371 (c)(1),
(2), (4) Date: Apr. 22, 2014

(87) PCT Pub. No.: WO2013/019704
PCT Pub. Date: Feb. 7, 2013

(65) Prior Publication Data
US 2014/0224495 A1 Aug. 14, 2014

Related U.S. Application Data

(60) Provisional application No. 61/513,002, filed on Jul. 29, 2011.

(51) Int. Cl.
*C09K 8/035* (2006.01)
*C09K 8/82* (2006.01)
(Continued)

(52) U.S. Cl.
CPC .............. *C09K 8/82* (2013.01); *C08G 83/003* (2013.01); *C09K 8/035* (2013.01); *C09K 8/524* (2013.01);
(Continued)

(58) Field of Classification Search
None
See application file for complete search history.

(56) References Cited

U.S. PATENT DOCUMENTS 5,418,301 A * 5/1995 Hult ................. C08G 63/12
525/437
2007/0100002 A1* 5/2007 Leinweber ........... B01D 17/047
516/179

(Continued)

FOREIGN PATENT DOCUMENTS

| EP | 1719789 B1 | 10/2008 |
|---|---|---|
| WO | 2008017007 A2 | 2/2008 |
| WO | 2008/113075 A1 | 9/2008 |

OTHER PUBLICATIONS

International Search Report of PCT/US2012/048786 dated Oct. 25, 2012, 6 pages.

(Continued)

*Primary Examiner* — Alicia Bland
(74) *Attorney, Agent, or Firm* — Sara K. M. Hinkley

(57) ABSTRACT

Disclosed herein is a fluid flow improver comprising a branched dendritic core comprising a first quaternary carbon center bonded to four second carbon atoms, wherein at least three of the four second carbon atoms are individually bonded to one or more chain extender ligands to produce the branched dendritic core, wherein the branched dendritic core has greater than or equal to about 16 terminal hydroxyl groups, and wherein at least one of the terminal hydroxyl groups is esterified with at least one carboxylic acid moiety comprising from 6 to 30 carbon atoms. Methods of inhibiting deposition of paraffin and reducing pour point temperature of a hydrocarbon fluid are also disclosed.

10 Claims, 4 Drawing Sheets

(51) Int. Cl.
  *C09K 8/524*  (2006.01)
  *C08G 83/00*  (2006.01)
  *C10G 29/22*  (2006.01)
  *C10L 1/02*  (2006.01)
  *C10L 1/198*  (2006.01)
  *C10L 10/14*  (2006.01)
  *C10L 10/16*  (2006.01)
  *E21B 43/16*  (2006.01)

(52) U.S. Cl.
  CPC ............ *C10G 29/22* (2013.01); *C10L 1/02* (2013.01); *C10L 1/1983* (2013.01); *C10L 1/1985* (2013.01); *C10L 10/14* (2013.01); *C10L 10/16* (2013.01); *E21B 43/16* (2013.01); *C10G 2300/302* (2013.01)

(56) References Cited

U.S. PATENT DOCUMENTS

| | | | | |
|---|---|---|---|---|
| 2008/0032902 | A1* | 2/2008 | Rivers | C09K 8/52 507/202 |
| 2008/0153931 | A1* | 6/2008 | Bruchmann | B01D 17/047 516/185 |
| 2009/0082528 | A1* | 3/2009 | Basheer | C08L 63/00 525/523 |
| 2015/0128484 | A1* | 5/2015 | Nordvik | C07C 67/08 44/398 |

OTHER PUBLICATIONS

Hedenqvist M S et al, "Transport properties of hyperbranched and dendrimer-like star polymers", Polymer, Elsevier Science Publishers B.V. GB, vol. 41, No. 5, Mar. 1, 200, pp. 1827-1840.

Tomalia, D.A., "Starburst Dendrimers: Molecular-Level Control of Size, Shape, Surface Chemistry, Topology, and Flexibility from atoms to Microscopic matter", Angew. Chem. Int Ed. Engl. 29 (1990) 138-175.

Nunez, et al., "Solution Rheology of Hyperbranched Polyesters and Their Blends with Linear Polymers," Macromoloecules, 2000, vol. 33, pp. 1720-1726.

Gang, et al., "Study on efficiency inhibiting paraffin of star shape polymer with different structure paraffin inhibitor," Applied Chemical, vol. 34, No. 1, Jan. 2005, pp. 19-21.

Office Action for the equivalent Chinese patent application 201280046428.9 dated Oct. 28, 2015.

* cited by examiner

HYDROCARBON FLUID FLOW IMPROVER

BACKGROUND

In the hydrocarbon drilling and production industry, crude oil refers to the desirable (and undesirable) hydrocarbon products extracted from the ground together with the associated aqueous phase and minor amounts of solids. The proportion of hydrocarbons in crudes varies from 5% to almost 100%, and comprises thousands of different molecules that may be grouped into four families of compounds: saturates, aromatics, resins and asphaltenes. Saturates generally constitute the lightest fraction of the crude oil while within the saturates family, $C_{18+}$ long-chain linear paraffins represent the heavy fraction of the saturates and are responsible for wax deposit formation.

Paraffin is a common name for a group of alkane hydrocarbons with the general formula $C_nH_{2n+2}$, where n is the number of carbon atoms. Paraffins may be divided into three groups: gases at room temperature (the lowest carbon number alkanes, $C_1$-$C_4$), liquids at room temperature (intermediate carbon number alkanes, $C_5$-$C_{17}$), and solids at room temperature (paraffin wax) (the heaviest alkanes, $C_{18}$ and above). At low temperatures (or at temperatures below the melting point for respective alkanes), long-chained compounds are known to crystallize and form large wax crystals having a sponge-like structure. Other constituents of the paraffin-containing fluid may also be trapped in the crystals' structures, which may lead to a faster growth of the wax network. The wax crystals may agglomerate or mass together, which may finally lead to the deposition of the paraffins on the transportation equipment and to the clogging of such equipment. Furthermore, the formation of a solid wax phase may lead to an increased viscosity, which means that the paraffin-containing fluid may become significantly more difficult to handle.

Paraffin deposition is a well-known phenomenon that plagues the oil industry all over the world. Typically, various types of products derived from crude oils such as diesel fuels, various oils of lubricating viscosity, automatic transmission fluids, hydraulic oil, home heating oils, crude oils and natural gas liquids and fractions thereof contain several types of hydrocarbons, such as paraffins.

At the temperature of the reservoir, the paraffins may be primarily liquid or gaseous and thus are dissolved in the crude oil. As the production stream rises to the surface and leaves the wellhead, the temperature and pressure start to decrease; the stream begins to cool from the elevated temperature and pressure as compared to the temperature and pressure of the wellhead. This chilling results in loss of fluidity and deposition of waxes, asphaltenes, etc., which drastically affects production operations. The wax deposits formed consists mainly of n-paraffins (linear alkanes) and small amounts of branched or isoparaffins and aromatic compounds (cycloparaffins, naphthalenes). The carbon number of paraffinic molecules present in wax deposits is typically $C_{15}$ or higher and may reach up to $C_{80}$. Studies have also indicated that the quantity of wax formation that will prevent flow or gel for an oil is quite small.

Dewaxing of an oil, the process of removing hydrocarbons which solidify readily (waxes) from petroleum fractions, may improve the low temperature fluidity of paraffin-containing fluids. This process may be accomplished using many different means, however, it is often considered to be an expensive procedure. Such dewaxing techniques have been used in combination with additives that reduce the size and change the shape of the wax crystals that form. Such additives operate on the basis that smaller size crystals are desirable as they are less likely to clog a filter. Other traditional methods to remediate wax crystallization are based on removing the precipitates already formed by thermal or mechanical methods, or by means of solvents.

SUMMARY

Embodiments disclosed herein relate to a fluid flow improver that includes dendrimer comprising a branched dendritic core having a first quaternary carbon center bonded to four second carbon atoms, where at least three of the four second carbon atoms are individually bonded to one or more chain extender ligands to produce the branched dendritic core, where the branched dendritic core has greater than or equal to about 16 terminal hydroxyl groups and wherein at least one of the terminal hydroxyl groups is esterified with at least one carboxylic acid moiety comprising from 6 to 30 carbon atoms, at least one substituted carboxylic acid moiety comprising from 6 to 30 carbon atoms, or a combination thereof, wherein the substituted carboxylic acid moiety comprises at least one functional group comprising elements from Groups 13 to 17 of the periodic table of the elements.

Other embodiments disclosed herein relate to a method for inhibiting the deposition of paraffin from a hydrocarbon fluid that includes adding an flow improver to the hydrocarbon fluid, to a method for reducing the pour point temperature of a hydrocarbon fluid including adding an a flow improver to the hydrocarbon fluid, and to method for adding to subterranean well.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Figure 1:
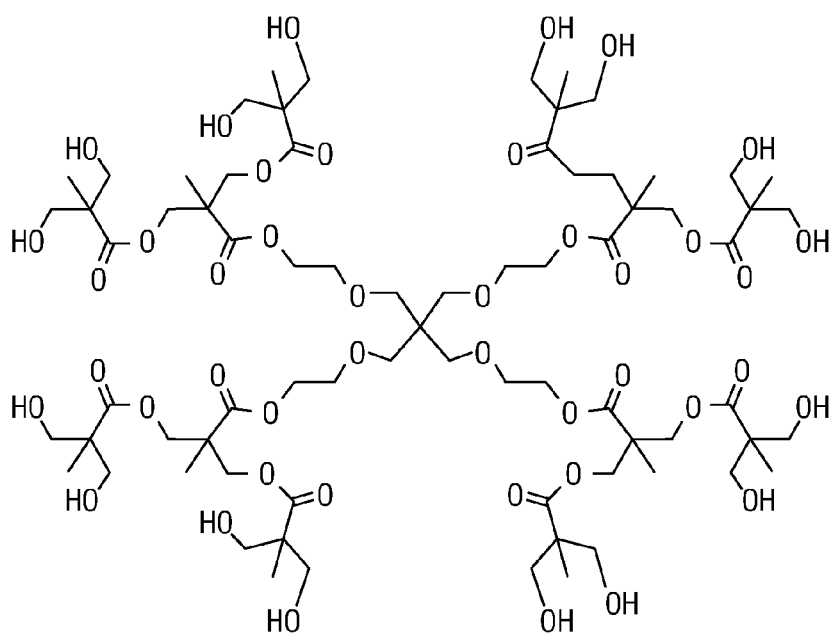
FIG. 1 is a representation of Boltorn H20.

The following detailed description is of the best currently contemplated modes of carrying out the various aspects of this disclosure. The description is not to be taken in a limiting sense, but is made merely for the purpose of illustrating the general principles of the disclosure, since the scope of the disclosure is best defined by the appended claims.

In the following description, numerous specific details are set forth to provide a thorough understanding of the present disclosure. However, details unnecessary to obtain a complete understanding of the present disclosure may have been omitted in as much as such details are within the skills of persons of ordinary skill in the relevant art.

Broadly, the present disclosure provides a flow improver for treating a fluid, and more specifically, a hydrocarbon fluid. For purposes herein, a hydrocarbon fluid refers to any fluid which comprises a hydrocarbon. Hydrocarbon fluids of the present disclosure may include crude oil, crude oil condensate, and the various streams which are produced during extraction of hydrocarbons from wells. Also included are refined streams including various fuel oils, diesel fuel, kerosene, gasoline, and the like. For purposes herein, the hydrocarbon fluid is regarded as encompassing any fluid which comprises a hydrocarbon so long as the flow improver is at least partially soluble in the fluid.

Broadly, the present disclosure generally provides a flow improver for treating a hydrocarbon fluid, wherein the flow improver comprises a branched dendrimer, also referred to herein as a hyperbranched dendrimer, and/or simply as a dendrimer. In an embodiment, the flow improver comprises a dendrimer comprising a branched dendritic core comprising a first quaternary carbon center bonded to four second carbon atoms, wherein each of the four second carbon atoms is bonded to a plurality of branched ligands to produce the branched dendritic core, wherein the branched dendritic core has greater than or equal to about 16 terminal hydroxyl groups, wherein at least one of the terminal hydroxyl groups is esterified with at least one carboxylic acid moiety comprising from 6 to 30 carbon atoms.

As described by Tomalia et al, Angew. Chem. Int. Ed. Engl., 29 (1990), 138, dendrimers are three-dimensional highly-ordered oligomers or polymers. They are obtainable by reiterative reaction sequences starting from an initiator core having one or more reactive sites. To each reactive site is attached one functional group only of a polyfunctional reactant. The reactant is then caused to react through its remaining functional group or groups with additional molecules either the same as the original core if it is polyfunctional or a different, polyfunctional, molecule or molecules, and so on, in each case under reaction conditions such that unwanted side reactions, for example, crosslinking, are avoided. In this way, a dendritic body is built up around the central core, each reiterative reaction sequence adding further reactants (or 'units') to the ends of the dendrites. Tomalia describes the manufacture of polyamidoamine (PAMAM) dendrimers; these may be made based on ammonia as a core, which is caused to react by Michael addition with methyl acrylate (Step A). The carboxyl group of the acrylate molecule is caused to react with one amino group only of ethylene diamine (Step B). The resulting triamine core cell is referred to by Tomalia as Generation 0; a further repetition of steps A and B provides a hexamine, referred to as Generation 1. Further repetitions of steps A and B produce higher generations which after Generation 4 result in concentric spheres of cells, the outermost sphere carrying external reactive groups. Other dendrimers described by Tomalia include polyethylenimine, hydrocarbon, polyether, polythioether, polyamide, polyamido-alcohol and polyarylamine dendrimers.

In an embodiment, branched, hyperbranched, and/or dendritic macromolecules (i.e., dendrimers) suitable for use herein may generally be described as three dimensional highly branched (i.e., hyperbranched) molecules having a tree-like structure. Suitable branched dendrimers may be highly symmetric, while similar macromolecules designated as branched, may, to a certain degree, hold an asymmetry, yet maintaining a highly branched tree-like structure. Dendrimers can be said to be monodispersed variations of branched macromolecules.

In an embodiment, branched dendrimers suitable for use herein comprise an initiator or nucleus having one or more reactive sites and a number of surrounding branching layers and optionally a layer of chain terminating molecules. As is known in the art, the layers are usually called generations, a designation hereinafter used. Branched dendritic or near dendritic macromolecules, also referred to herein as a branched dendritic core, may have three or more generations. Embodiments of the branched dendritic core may be illustrated by Formulae (I) and (II),

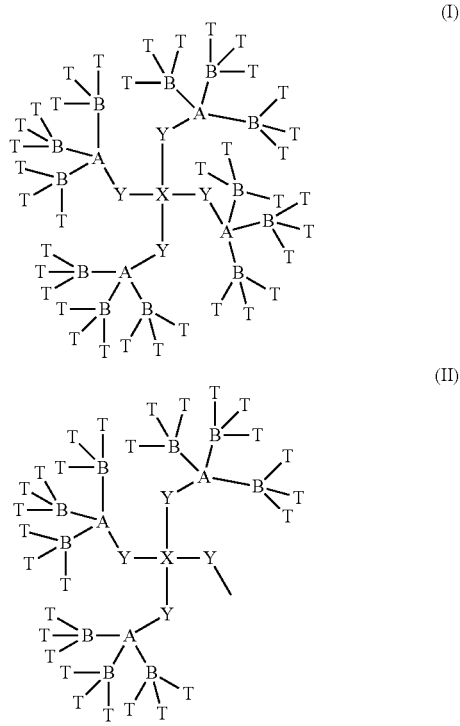

wherein X is a first quaternary carbon center bonded to four second carbon atoms Y, wherein each of the four second carbon atoms Y is each bonded through one or more chain extender ligands, which may be linear or branched, to produce the branched dendritic core.

In an embodiment, A and B are chain extender ligands having two or four reactive sites each. Suitable examples include polyfunctional ligands comprising hydroxyl groups, epoxides, carboxylic acids, and the like.

In an embodiment, each of the chain extender forms one generation in the branched dendritic core. As shown above, A and/or B may include a plurality of chain extenders, linked together, each providing a branching point which is eventually terminated by a T functional group. Each of the A and B chain extenders may be the same or different.

In an embodiment, the branched dendrimer core, including the branches and terminating chains, do not include nitrogen atoms. In an embodiment, the branched dendrimer core, including the branches and terminating chains, consists essentially of carbon, hydrogen and oxygen. In an embodiment, A and B may consist essentially of carbon, hydrogen and/or oxygen. As disclosed above, T is a terminating chain stopper forming the last generation. T may either be monofunctional or give a suitable terminal functionality. In an embodiment, T may be selected from at least one of a hydroxyl, carboxyl or epoxide group. Each T may be a terminal hydroxyl group or a terminal hydroxyl group esterified with at least one carboxylic acid moiety comprising from 6 to 30 carbon atoms. The branched dendritic core may have greater than or equal to about 16 terminal hydroxyl groups, wherein at least one of the terminal hydroxyl groups is esterified with at least one carboxylic acid moiety comprising from 6 to 30 carbon atoms.

In an embodiment, the branched dendritic core may be represented by Formula III below.

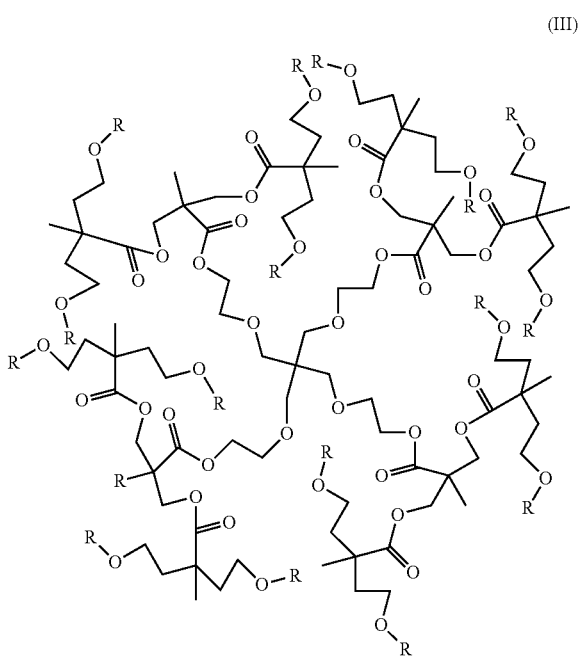

(III)

In an embodiment, the Formula III branched dendritic core do not comprise nitrogen functionality, and more specifically does not comprise amine or amide functionality. Each R may be a hydrogen (i.e., a hydroxyl terminal group) or an esterified hydroxyl group which has been esterified with at least one carboxylic acid moiety selected from the group consisting of: greater than or equal to about 6 carbon atoms, greater than or equal to about 10 carbon atoms, and from 6 to 40 carbon atoms, with from 6 to 30 carbon atoms. Embodiments of R may include —COO—$(CH_2)_x$—$(CH)_y$—$CH_z$, wherein x+y=8-28, wherein y is from 0 to 5, and wherein z is 1, 2, or 3. Accordingly, the ester linkage may include both saturated and unsaturated carboxylic acids, as well as branched and/or linear carboxylic acids.

In an embodiment, prior to being esterified with the carboxylic acid, the branched dendritic core has a hydroxyl number of greater than or equal to about 490 mg KOH/g, wherein the hydroxyl number represents the hydroxyl content of a dendritic core, and is derived by acetylating the hydroxyl and titrating the resultant acid against KOH, as is known in the art. The hydroxyl number is thus the weight of KOH in milligrams that will neutralize the acid from 1 gram of the dendritic core prior to being esterified with a carboxylic acid.

In an embodiment, the branched dendritic core may comprise at least one carboxylic acid and/or substituted carboxylic acid moiety having from 6 to 30 carbon atoms, or from 8 to 24 carbon atoms, where essentially all of the terminal hydroxyl groups of the branched dendritic core are each esterified with at least one carboxylic acid moiety having from 12 to 22 carbon atoms. In an embodiment, the terminal hydroxyl groups on the branched dendritic core are each individually esterified with a corresponding number of the same carboxylic acid moiety. The carboxylic moiety may be individually selected from a carboxylic acid moiety and/or a substituted carboxylic acid moiety having from 6 to 30 carbon atoms, or having from 12 to 22 carbon atoms. In an embodiment, the carboxylic acid moieties may be derived from carboxylic acids selected from the group consisting of substituted or unsubstituted capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, melissic acid, myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid, docosahexaenoic acid, resinolic acid, and combinations thereof.

In an embodiment, the branched dendritic core comprises terminal carboxylic acid moieties selected from the group consisting of carboxylic acids and substituted carboxylic acids having from 8 to 24 carbon atoms, or having 12, 14, 16, 18, 20 and 22 carbon atoms, and combinations thereof. In an embodiment, the at least one carboxylic acid moiety or substituted carboxylic acid moiety is selected from the group consisting of lauric acid, myristic acid, palmitic acid, stearic acid, 12-hydroxy steric acid, and combinations thereof. Accordingly, the term "branched dendritic core" as used herein refers to a branched dendritic core wherein at least one of the terminal hydroxyl groups is esterified with at least one carboxylic acid and/or substituted carboxylic acid moiety comprising from 6 to 30 carbon atoms.

In an embodiment, the carboxylic acid moiety is a substituted carboxylic acid moiety which is substituted with at least one functional group comprising elements from one or more of Groups 13-17 of the periodic table of the elements. In an embodiment, the carboxylic acid moiety is a substituted carboxylic acid moiety which is substituted with at least one functional group comprising elements from one or more of Group 13, 14, 16, or 17 of the periodic table of the elements. In an embodiment, the at least one function group consists essentially of carbon, hydrogen, oxygen, sulfur and/or a halogen. In an embodiment, the substituted carboxylic acid moiety comprises a hydroxyl functional group, a halogen functional group, or a combination thereof. In an embodiment, the substituted carboxylic acid moiety is a hydroxy substituted carboxylic acid. In an embodiment, the substituted carboxylic acid moiety is 12 hydroxy stearic acid.

Commercially available branched dendritic cores prior to esterification, which are suitable for use herein include polyols sold by Perstorp AB Corporation Sweden under the name Boltorn®, (Perstorp, Sweden), including Boltorn®

Figure 2:
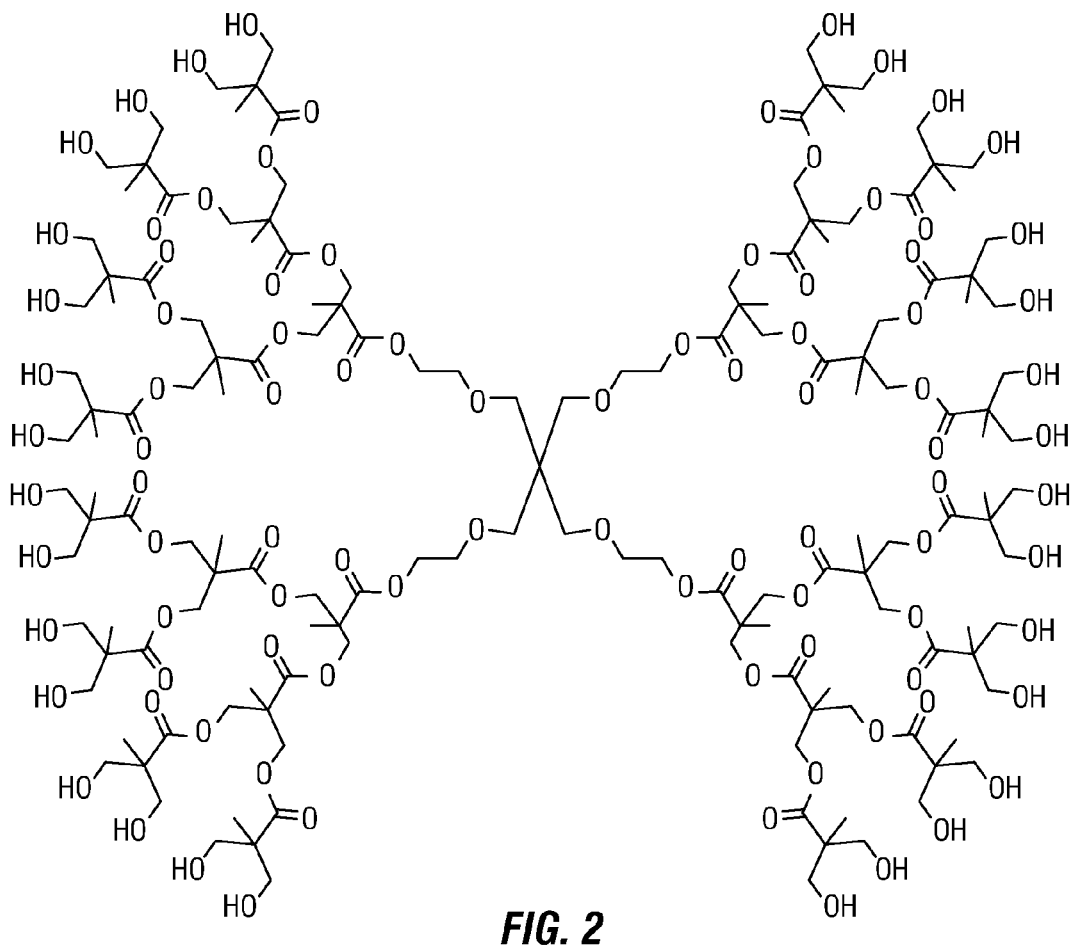
FIG. 2 is a representation of Boltorn H30.
Figure 3:
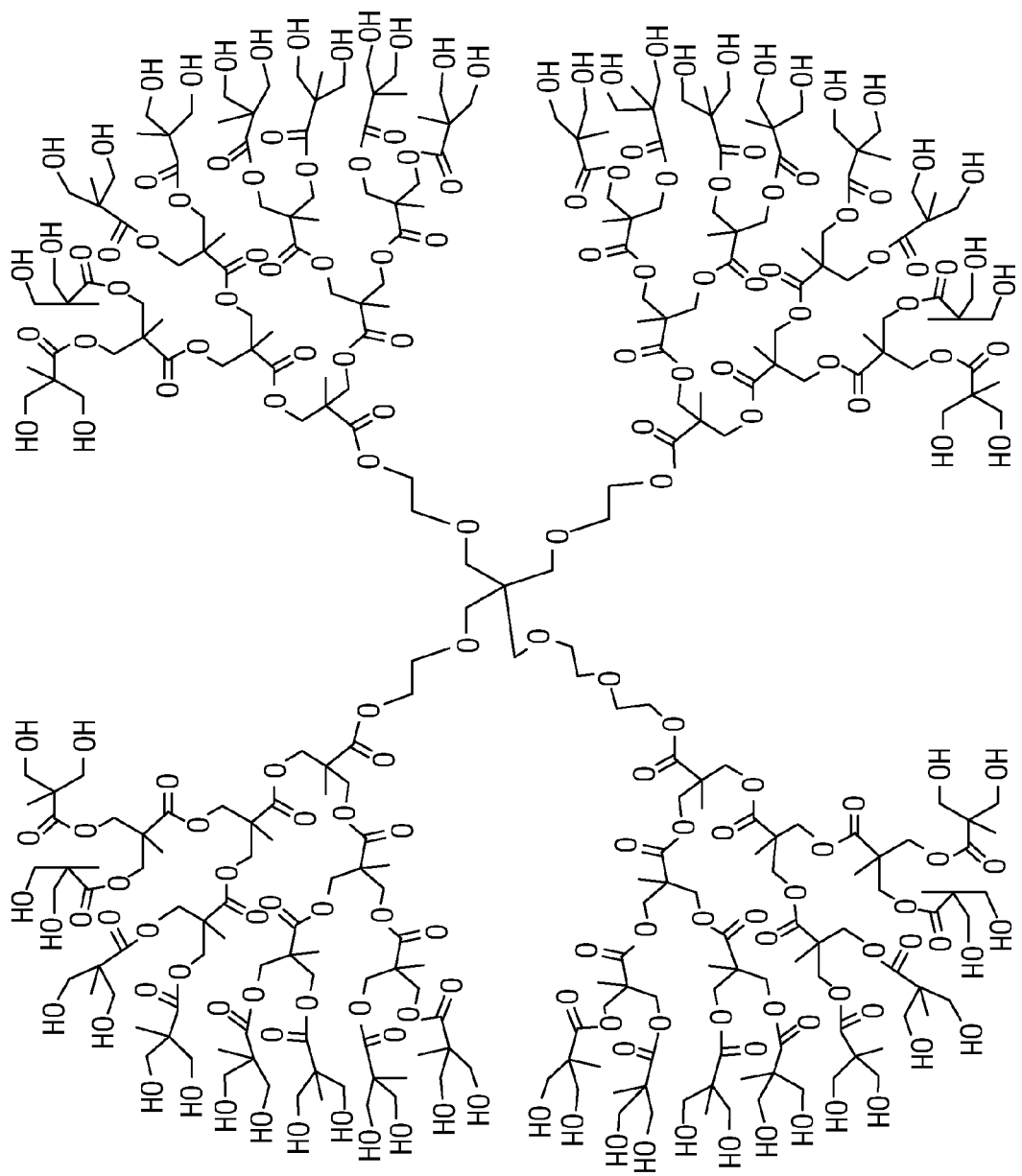
FIG. 3 is a representation of Boltorn H40.

H20 (See FIG. 1), Boltorn® H30 (see FIG. 2), Boltorn® H40 (see FIG. 3), and the like.

In some embodiments, the flow improver may include one or more solvents and/or one or more surfactants, in addition to a dendrimer. Suitable solvents may include aromatic solvents, such as, without limitation, xylene and toluene. Suitable surfactants may include nonionic surfactants, cationic surfactant, and anionic surfactants. Examples of nonionic surfactants include, without limitation, ethoxylated linear alcohols, ethoxylated alkyl phenols, fatty acid esters, amine and amide derivatives, alkylpolyglucosides, ethyleneoxide/propyleneoxide copolymers, polyalcohols, and ethoxylated polyalcohols. Examples of cationic surfactants include, without limitation, quaternary ammonium compounds, oxy and ethoxylated amines, linear diamines, amide, ester and ether-amines, alkanol amides, and amino acids. Examples of anionic surfactants include, without limitation, alkyl ether sulfates, sulfated alkanolamides, glyceride sulfates, alky benzenesulphonic acids and their sats, alpha olefin sulphonates, lignosulphonates, and phosphate esters.

Physical Properties of the Flow Improver

In an embodiment, the flow improver comprises a branched dendritic core, which may be dissolved in a solvent. In an embodiment, a 50 wt % of the flow improver dissolved in xylene has a viscosity as determined according to ASTM D2983 or an equivalent thereof. In an embodiment, the viscosity of a 50 wt % of the flow improver dissolved in xylene is less than or equal to about 200 cp at 4° C., or less than or equal to about 100 cp at 4° C., or less than or equal to about 50 cp at 4° C., or less than or equal to about 25 cp at 4° C., or less than or equal to about 20 cp at 4° C., or less than or equal to about 15 cp at 4° C.

In an embodiment, a 25 wt % solution of the flow improver dissolved in xylene has a viscosity of less than or equal to about 100 cp at 4° C., or less than or equal to about 50 cp at 4° C., or less than or equal to about 40 cp at 40° C., or less than or equal to about 30 cp at 4° C., or less than or equal to about 20 cp at 4° C., or less than or equal to about 10 cp at 4° C.

Inhibition of Paraffin Deposition

In an embodiment, the flow improver described herein functions to inhibit paraffin deposition from a hydrocarbon fluid having a wax appearance temperature. For purposes herein, a hydrocarbon fluid has a wax appearance temperature, when a precipitate (e.g., paraffin, wax, or other solid material) forms upon cooling of the fluid. The wax appearance temperature is the temperature at which the paraffin precipitates. This phenomenon may occur when the fluid contacts a surface having a temperature below the wax appearance temperature. The dissipation temperature of the fluid is the temperature at which the precipitate re-dissolves into the fluid, and the fluid becomes single phase. The wax appearance temperature is determined using a microscope having polarization and phase contrast employing an objective lens of 10×, and an optical lens of 10×. Samples of the fluid are first incubated at 80° C. for a minimum of 24 hours to eliminate any thermal history. Next, a drop of the sample to be analyzed is placed on a slide equilibrated with the stage at 80° C. and covered with a cover slide such that the sample is positioned within the optical path of microscope. The sample is then brought into focus. The temperature of the stage is then ramped down via computer control and an optical reading is taken via computer control in 20 second intervals according to methods known in the art. The temperature at which a phase contrast is detected is recorded as the wax appearance temperature. The temperature is then ramped upward and the temperature at which the phase contrast disappears is recorded as the dissipation temperature. The rate at which the sample is ramped both up and down may range from about 10° C./min, down to less than 1° C./min depending on the accuracy required in the measurement. The measurement is generally made at least in duplicate, and the value averaged. For purposes herein, for brevity, the method to determine wax deposition temperature herein described is referred to as variable temperature polarized visual light microscopy at an objective lens of 10×, and an optical lens of 10×.

In an embodiment, wax inhibition may also be determined using a cold finger procedure, which determines the ability of the flow improver to inhibit paraffin formation for waxy crude oils. The cold finger test is conducted using a temperature controlled chamber that keeps the sample at a prescribed temperature, typically above the sample's wax appearance temperature, and a metal tube, referred to as the cold finger, which is maintained at the desired test temperature, typically below that of the surrounding oil. The temperature of the cold finger is typically at the temperature of interest for a particular end use. For example, deep water drilling, defined herein as a well located at a depth of at least 1000 m below the surface of the water, may dictate a cold finger temperature of 4° C., which is the temperature of the environment at the ocean floor.

In an embodiment, the test may be conducted by contacting a sample of the hydrocarbon fluid being maintained at a temperature above the wax appearance temperature with the cold finger, which is maintained at the temperature of interest, which is below the wax appearance temperature of the hydrocarbon fluid. A heat flux across the finger's metal surface and the bulk hydrocarbon fluid induces precipitation of the paraffin (i.e., wax deposition). The wax deposit that is formed for an untreated hydrocarbon fluid (i.e., in the absence of the flow improver) is determined gravimetrically, and compared the deposit that is formed for a treated hydrocarbon fluid, (i.e., with the flow improver present in the hydrocarbon fluid). A percent inhibition number is then calculated from the ratio of the two values.

Representative flow improvers described herein may be tested using the following procedure, or an equivalent thereof. A hydrocarbon fluid is combined with the flow improver at a dosage of interest. The flow improver may be dissolved in xylene, toluene, or another suitable solvent. The hydrocarbon fluid is then maintained at a particular temperature above the wax appearance temperature and then contacted with the cold finger maintained at the temperature of interest for an appropriate amount of time, depending on the purported end use. At the end of the test, the cold finger is removed from the test chamber and washed with an appropriate solvent to remove the hydrocarbon fluid, but not the precipitated paraffin. A suitable solvent for this purpose includes cold 2-butanone. The washed cold finger is then allowed to dry. Next, the cold finger is contacted with a suitable amount of xylene, toluene, or the like to remove the paraffin deposition. The solvent is then removed from the paraffin using a rotary evaporator or the like, and the amount of paraffin determined gravimetrically. The amount of inhibition is expressed as a percentage, determined relative to the cold finger deposition of an essentially identical hydrocarbon fluid determined under essentially identical conditions in the absence of the flow improver.

In an embodiment, a concentration from about 10 ppm to less than or equal to about 500 ppm, or less than or equal to about 400 ppm, or less than or equal to about 300 ppm, or less than or equal to about 200 ppm, or less than or equal to about 100 ppm of the flow improver at least partially dissolved in a hydrocarbon fluid having a wax appearance temperature, produces a reduction in cold finger deposition from the hydrocarbon fluid as compared to the cold finger deposition of an essentially identical hydrocarbon fluid determined under essentially identical conditions in the absence of the flow improver, where in the cold finger deposition is determined with the hydrocarbon fluid above the wax appearance temperature and the cold finger temperature below the wax appearance temperature of the hydrocarbon fluid.

In an embodiment, a concentration from about 10 ppm to less than or equal to about 500 ppm, or less than or equal to about 400 ppm, or less than or equal to about 300 ppm, or less than or equal to about 200 ppm, or less than or equal to about 100 ppm of the flow improver at least partially dissolved in a hydrocarbon fluid having a wax appearance temperature, produces a reduction in cold finger deposition of greater than or equal to about 5 wt %, or greater than or equal to about 10 wt %, or greater than or equal to about 15 wt %, or greater than or equal to about 20 wt %, or greater than or equal to about 25 wt %, or greater than or equal to about 30 wt %, or greater than or equal to about 40 wt %, determined relative to an essentially identical hydrocarbon fluid determined under essentially identical conditions in the absence of the flow improver.

In an embodiment, a concentration from about 10 ppm to less than or equal to about 500 ppm, or less than or equal to about 400 ppm, or less than or equal to about 300 ppm, or less than or equal to about 200 ppm, or less than or equal to about 100 ppm of the flow improver at least partially dissolved in a hydrocarbon fluid having a wax appearance temperature, produces a reduction in the wax appearance temperature of the hydrocarbon fluid as compared to the wax appearance temperature of an essentially identical hydrocarbon fluid determined under essentially identical conditions in the absence of the flow improver, wherein the wax appearance temperature is determined using variable temperature polarized visual light microscopy at an objective lens of 10×, and an optical lens of 10×.

In an embodiment, a concentration from about 10 ppm to less than or equal to about 500 ppm, or less than or equal to about 400 ppm, or less than or equal to about 300 ppm, or less than or equal to about 200 ppm, or less than or equal to about 100 ppm of the flow improver at least partially dissolved in a hydrocarbon fluid having a wax appearance temperature, produces a reduction in the wax appearance temperature of the hydrocarbon fluid of greater than or equal to about 1° C., or greater than or equal to about 2° C., or greater than or equal to about 3° C., or greater than or equal to about 5° C., or greater than or equal to about 7° C., or greater than or equal to about 10° C., or greater than or equal to about 15° C., determined relative to an essentially identical hydrocarbon fluid determined under essentially identical conditions in the absence of the flow improver.

In an embodiment, a concentration greater than or equal to about 10 ppm of the flow improvers of the instant disclosure reduce the pour point of a hydrocarbon fluid. In an embodiment, flow improvers of the present disclosure that produce a reduction in the pour point temperature of the hydrocarbon fluid as compared to the pour point temperature of an identical hydrocarbon fluid in the absence of the flow improver, wherein pour point temperature is determined according to ASTM D97 or an equivalent thereof, may be present in the hydrocarbon fluid at a concentration from about 10 ppm to less than or equal to about 500 ppm of the flow improver, or less than or equal to about 400 ppm, or less than or equal to about 300 ppm, or less than or equal to about 200 ppm of the flow improver, or less than or equal to about 100 ppm of the flow improver at least partially dissolved in a hydrocarbon fluid.

In an embodiment, the reduction in the pour point temperature of a hydrocarbon fluid comprising the flow improver is greater than or equal to about 2° C., or greater than or equal to about 3° C.; or greater than or equal to about 4° C.; or greater than or equal to about 5° C.; or greater than or equal to about 7° C.; or greater than or equal to about 10° C.; or greater than or equal to about 15° C.; or greater than or equal to about 20° C.; or greater than or equal to about 30° C. compared to the pour point temperature of an identical hydrocarbon fluid in the absence of the flow improver, and/or a sufficient amount of the flow improver to effect a change in the pour point temperature is the amount required to produce a concentration from about 10 ppm to less than or equal to about 500 ppm of the flow improver, or less than or equal to about 400 ppm, or less than or equal to about 300 ppm, or less than or equal to about 200 ppm of the flow improver, or less than or equal to about 100 ppm of the flow improver at least partially dissolved in the hydrocarbon fluid.

In an embodiment, flow improvers of the present disclosure may be a mixture comprising a plurality of flow improvers, each having a branched dendritic core comprising a first quaternary carbon center bonded to four second carbon atoms, wherein each of the four second carbon atoms is bonded to a plurality of branched ligands to produce the branched dendritic core, wherein the branched dendritic core has greater than or equal to about 16 terminal hydroxyl groups, wherein at least one of the terminal hydroxyl groups on each of the branched dendritic cores is esterified with at least one carboxylic acid moiety comprising from 6 to 30 carbon atoms to produce an esterified branched dendritic core, and wherein a first portion of the plurality of esterified branched dendritic cores is esterified with a different carboxylic acid moiety than a second portion of the plurality of esterified branched dendritic cores. In an embodiment, a combination of flow improvers according to the instant disclosure may be selected to tailor the flow improver to the properties of a particular hydrocarbon fluid and/or a particular set of conditions, wherein the relative amount of esterified hydroxyl groups present on the branched dendritic core are varied, and/or wherein the carboxylic acid moieties are varied, and/or wherein the branched dendritic core is varied to produce different flow improvers according to the instant disclosure.

In an embodiment, a method comprises adding a flow improver according to any one or combination of embodiments disclosed herein to a first hydrocarbon fluid to produce a second hydrocarbon fluid. In an embodiment, the first hydrocarbon fluid is a hydrocarbon fluid produced during extraction of hydrocarbons from a well, crude oil, a crude oil condensate, a middle distillate, a fuel oil, diesel, or a combination thereof. In an embodiment, a pour point temperature of the second hydrocarbon fluid is less than a pour point temperature of the first hydrocarbon fluid, wherein the pour point temperature determined according to ASTM D97, or an equivalent thereof; and/or a wax appearance temperature of the first hydrocarbon fluid is higher than a wax appearance temperature of the second hydrocarbon fluid, and/or the flow improver is present in the second hydrocarbon fluid at a concentration of about 10 ppm to less than or equal to 500 ppm, and/or the pour point temperature of the second hydrocarbon fluid is reduced by at least 3° C. as compared to the pour point temperature of the first hydrocarbon fluid; and/or the wax appearance temperature of the second hydrocarbon fluid is reduced by at least 3° C. as compared to the wax appearance temperature of the first hydrocarbon fluid; wherein the wax appearance temperature is determined using variable temperature polarized visual light microscopy at an objective lens of 10×, and an optical lens of 10×.

In an embodiment, a method comprises extracting a hydrocarbon fluid from a well and adding a flow improver according to any one or combination of embodiments disclosed herein to the hydrocarbon fluid. In an embodiment, flow improver is added to the hydrocarbon fluid prior to the hydrocarbon fluid being extracted from the well, the flow improver is added to the hydrocarbon fluid after the hydrocarbon fluid has been extracted from the well, or a combination thereof. In an embodiment, the well is located underwater. In an embodiment, the well is a deep water well located at least 1000 meters below the surface of the water.

In an embodiment, the flow improver is added to a subterranean well. In an embodiment, the flow improver may be added to a hydrocarbon fluid in the well (i.e. a first hydrocarbon fluid. In an embodiment, a hydrocarbon fluid containing the flow improver (i.e. a second hydrocarbon fluid) may be produced from the well. In another embodiment, the flow improver may be added to a hydrocarbon fluid produced from a well at the well head or at the surface. In still another embodiment, the flow improver is added to a hydrocarbon fluid prior to transporting the hydrocarbon fluid in a pipeline or a tank.

EXAMPLES

Three embodiments of flow improvers were produced according to the instant disclosure. Boltorn H20 was obtained from Perstorp (Sweden) and used without further purification. Boltorn H20 is assumed to have an average molecular weight of 1750 g/mol. Laurie acid, ($C_{12}$), palmitic acid ($C_{16}$), and stearic acid ($C_{18}$) were obtained from laboratory supply and used without further purification. p-toluenesulfonic acid (TsOH) was obtained from laboratory supply, and used without further purification.

Example 1

36.6 g of lauric acid (183 mmol) was combined with 20 g of Boltorn H20 (11 mmol) and a catalytic amount of TsOH ~0.01%. The mixture was heated to 140° C. and stirred for 1 hour then placed under vacuum and stirred for an additional 7 hours to produce 47.73 g of a brown viscous liquid, the lauric ester of Boltorn H20.

Examples 2 and 3

Example 2 was produced in the same manner as Example 1, using a slight molar excess (greater than 16 eq.) of palmitic acid to produce Example 2. Example 3 was produced in the same manner as Example 1, using a slight molar excess (greater than 16 eq.) of stearic acid to produce Example 3. The product appearances are detailed below in Table 1.

TABLE 1

Product Physicals

| Sample | Appearance |
| --- | --- |
| Example 1 | Liquid/Amber in Color |
| Example 2 | Solid/Light Brown in Color |
| Example 3 | Solid/Dark Brown in Color |

The hydrocarbon fluid utilized as a sample was a waxy condensate. Observations on paraffin crystal formation and deposition, Pour Point Temperature (PPT) reduction, rheology profiles and viscosity of the products at 4° C. and 20° C. were performed.

As shown in Table 2 below, to simulate potential deep water use of the Examples, each was diluted to 25% with xylene. The initial viscosity evaluations suggest that Example 1 is within the required viscosity range for umbilical deployment at the 50% concentration. Examples 2 and 3 may require a final concentration of 25-50% to be acceptable for deep water use.

As shown in Table 3 below, the hydrocarbon fluid had a pour point temperature of 9+3° C.; this was lowered by 3° C. by addition of 300 ppm of Example 1. The pour point temperature was lowered to less than 9° C. upon a dosage rate of 300 ppm of Examples 2 and 3.

As shown in Table 4 below, the 25% concentrations of Examples 1, 2, and 3 each provided marked improvements in the rheology profile of the hydrocarbon fluid when dosed at 300 ppm. Cold Finger analysis showed all three products providing a reduction in the mass of deposition, ranging from 22-47%.

TABLE 2

Viscosity at Various Concentrations in Xylene.

| Property | Concentration | Example 1 | Example 2 | Example 3 |
| --- | --- | --- | --- | --- |
| Viscosity at 20° C.* | 50% | 11.74 cP | 13.73 cP | 12.03 cP |
| Viscosity at 4° C.* | 50% | 19.31 cP | Pseudoplastic | Out of Range |
| Viscosity at 20° C.* | 25% | 2.45 cP | 2.83 cP | 2.70 cP |
| Viscosity at 4° C.* | 25% | 3.23 cP | 3.54 cP | 4.10 cP |

*Viscosity determined according to ASTM D2983

Pour Point Temperature

The effect of the products on the pour point temperature (PPT) of the hydrocarbon fluid is displayed in Table 3 below. Due to limitations in equipment, final values for Examples 2 and 3 were not possible to attain.

TABLE 3

Pour Point Temperature Values.

| Sample | Concentration | Dosage | 12° C. | 9° C. | 6° C. | 3° C. | 0° C. |
|---|---|---|---|---|---|---|---|
| Blank | | 0 ppm | flowing | Not flowing | | | |
| Example 1 | 25% | 300 ppm | flowing | flowing | Not flowing | | |
| Example 2 | 25% | 300 ppm | flowing | flowing | flowing | flowing | <3° C. |
| Example 3 | 25% | 300 ppm | flowing | flowing | flowing | flowing | <3° C. |

Cold Finger Analysis

The cold finger analysis was performed with the condensate kept at a temperature of 26° C. and the cold finger at −1° C. over a two hour period. Table 4 displays the results of this analysis.

TABLE 4

Cold Finger Analysis of Condensate.

| Sample | Mass of Deposit | Reduction in Mass |
|---|---|---|
| Blank | 3.0190 g | 47% |
| Example 1 | 1.6121 g | |
| Blank | 2.4864 g | 43% |
| Example 2 | 1.4260 g | |
| Blank | 2.7220 g | 22% |
| Example 3 | 2.1142 g | |

Rheology

Figure 4:
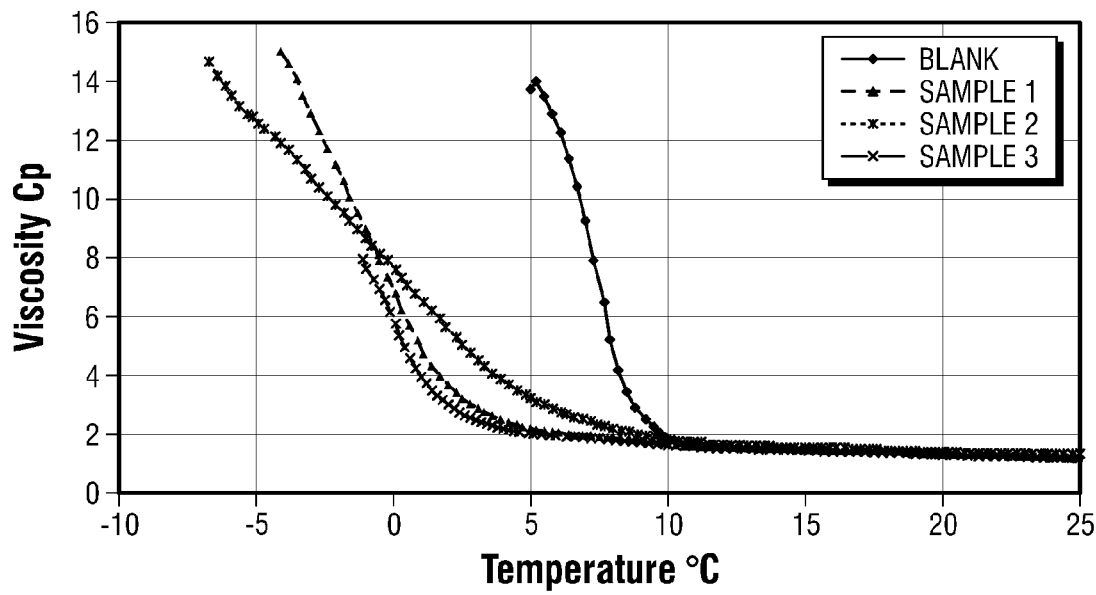
FIG. 4 is a Rheological graph depicting viscosity vs. temperature at an applied shear rate for flow improvers of the present disclosure.

The graph shown in FIG. 4 displays the effects on the rheology of the hydrocarbon fluid when dosed with 300 ppm of the diluted products. Analysis was performed with an applied shear rate of 264 s$^{-1}$ over a temperature profile from 40° C. to −10° C.

Figure 5:
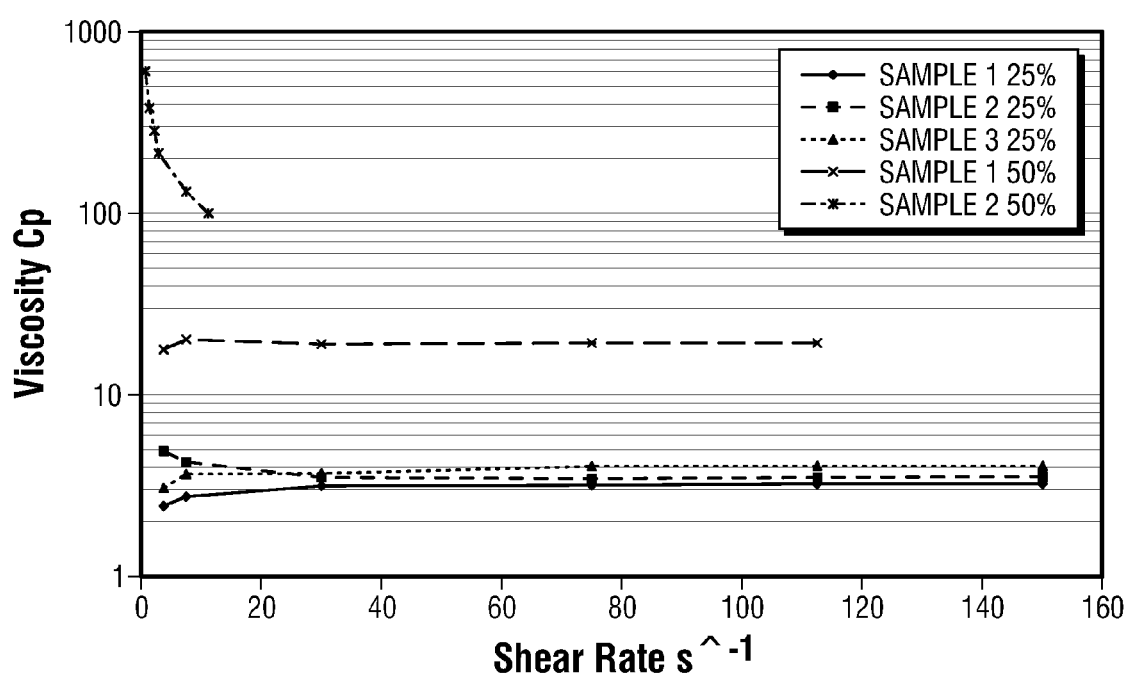
FIG. 5 is a Rheological graph depicting flow improvers viscosity vs. shear rate at a constant temperature for flow improvers of the present disclosure.

The graph shown in FIG. 5 displays the effects on the rheology of the hydrocarbon fluid when dosed with 300 ppm of the diluted products. Analysis was performed with a variable applied shear rate at a constant temperature of 4° C.

Figure 6:
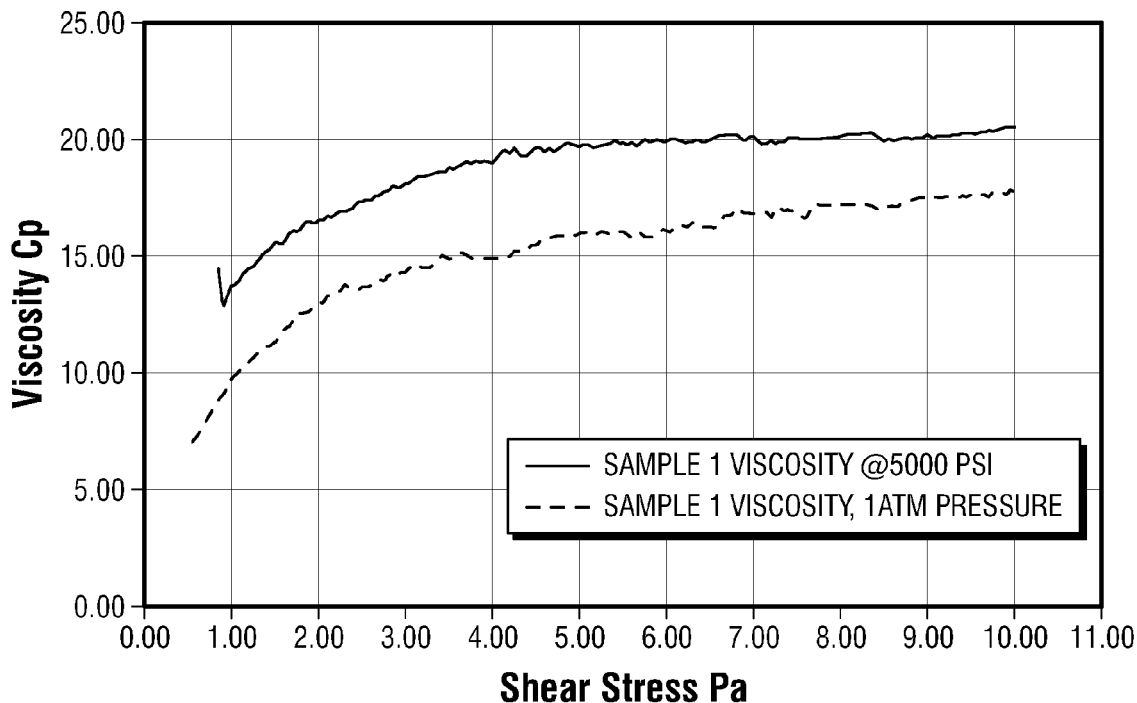
FIG. 6 is a Rheological graph depicting the viscosity of embodiments at atmospheric pressure and at 5000 psi.
Figure 7:
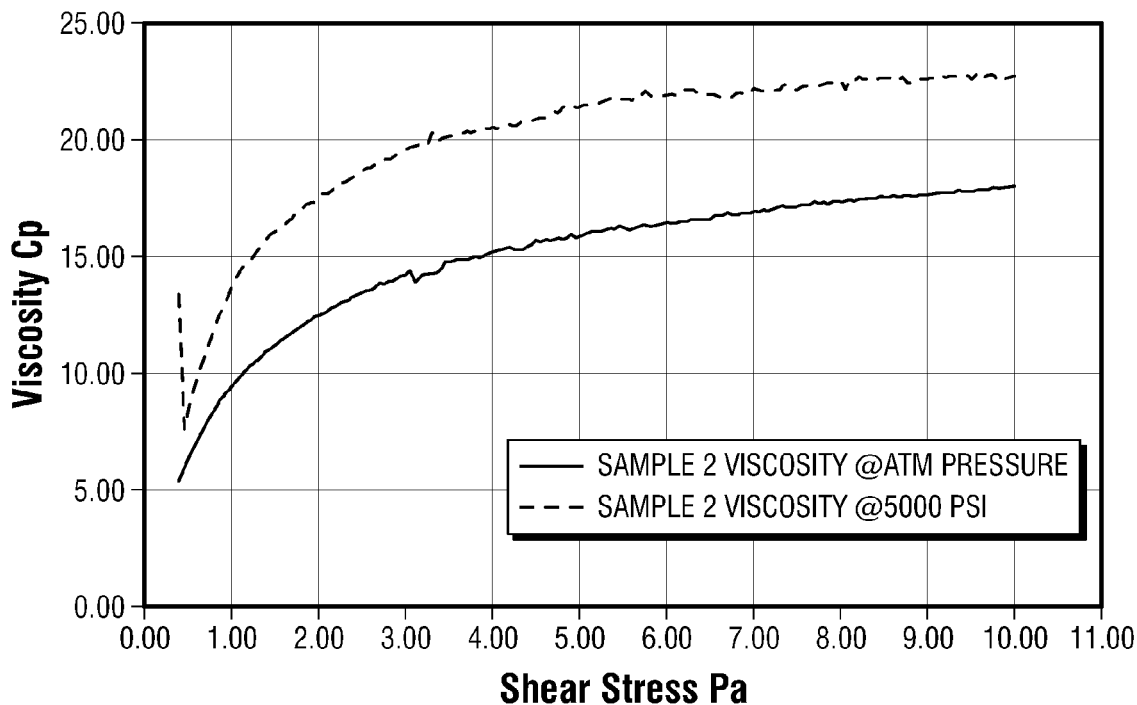
FIG. 7 is a Rheological graph depicting the viscosity of embodiments at atmospheric pressure and at 5000 psi.

The graph shown in FIGS. 6 and 7 represent the viscosity profiles of Examples 1 and 2 respectively at atmospheric pressure and at 5000 psi.

Additional Examples 4-6 were tested for their effect on paraffin dispersion in oil samples obtained from the Eagleford Shale in Texas. Example 4 included 50 vol. % of xylene, 35 vol. % of a dendritic polymer prepared by esterification of a dendrimeric polyol (available from Perstorp Specialty Chemicals AB of Perstorp Sweden under the tradename Bolton H311) with behenic acid, and 15 vol. % of a anionic surfactant (BIO-SOFT 411E, available from Stepan Company),).

Example 5 included 45 vol. % of xylene, 35 vol. % of a dendritic polymer prepared by esterification of a dendrimeric polyol (available from Perstorp Specialty Chemicals AB of Perstorp Sweden under the tradename Bolton H311) with behenic acid, 15 vol. % of isopropylamine alkylbenzene sulphonate, an anionic surfactant (BIO-SOFT 411E, available from Stepan Company), and 5 vol. % of sodium dihexyl sulfosuccinate, a non-ionic surfactant, (Aerosol MA801, available from Cytech Industries).

Example 6 included 45 vol. % of xylene, 35 vol. % of a dendritic polymer prepared by esterification of a dendrimeric polyol (available from Perstorp Specialty Chemicals AB of Perstorp Sweden under the tradename Bolton H311) with behenic acid, 15 vol. % of isopropylamine alkylbenzene sulphonate, an anionic surfactant (BIO-SOFT 411E, available from Stepan Company),), and 5 vol. % of dioctyl sodium sulfosuccinate, an anionic surfactant (Aerosol OT-S, available from Cytech Industries).

The paraffin dispersion test was performed by adding 500 ppm of each of Examples 4-6 to bottles containing 100 ml of the oil sample. The bottles were shaken at 20 rpm for 6 hours. Each bottle was then visually inspected for paraffin deposition at the bottom of the bottle.

Examples 4-6 containing both the dendrimer and surfactants showed little or no deposition. This was significantly less deposition than a blank sample containing only oil and somewhat less than samples containing only a dendimer.

EMBODIMENTS

Accordingly, the instant disclosure provides the following embodiments and more:

A. A hydrocarbon fluid flow improver comprising a dendrimer comprising a branched dendritic core comprising a first quaternary carbon center bonded to four second carbon atoms, wherein at least three of the four second carbon atoms are individually bonded to one or more chain extender ligands to produce the branched dendritic core, wherein the branched dendritic core has greater than or equal to about 16 terminal hydroxyl groups, and wherein at least one of the terminal hydroxyl groups is esterified with at least one carboxylic acid moiety comprising from 6 to 30 carbon atoms, at least one substituted carboxylic acid moiety comprising from 6 to 30 carbon atoms, or a combination thereof, wherein the substituted carboxylic acid moiety comprises at least one functional group comprising elements from Groups 13 to 17 of the periodic table of the elements.

B. The flow improver of embodiment A, wherein the branched dendrimer core, including the branches and terminating chains, do not include nitrogen atoms.

C. The flow improver of embodiment A or B, wherein essentially all of the terminal hydroxyl groups are each individually esterified with at least one carboxylic acid moiety or at least one substituted carboxylic moiety having 12, 14, 16, 18, 20 and 22 carbon atoms.

D. The flow improver of any one of embodiments A, B, or C, wherein essentially all of the terminal hydroxyl groups on the branched dendritic core are each individually esterified with a corresponding number of the same carboxylic acid moiety or substituted carboxylic acid moiety.

E. The flow improver of embodiment D, wherein the carboxylic acid moieties are selected from the group consisting of carboxylic acids and functional group substituted carboxylic acids having 12, 14, 16, 18, 20 and 22 carbon atoms.

F. The flow improver of any one of embodiments A, B, or C, wherein essentially all of the terminal hydroxyl groups on the branched dendritic core are each esterified with a carboxylic acid moiety or a substituted carboxylic acid moiety, and wherein a plurality of different carboxylic acid moieties, substituted carboxylic acid moieties, or a combination thereof are present on the same dendritic core.

G. The flow improver of embodiment F, wherein the carboxylic acid moieties or the substituted carboxylic acid moieties are selected from the group consisting of carboxylic acids having 12, 14, 16, 18, 20 and 22 carbon atoms.

H. The flow improver of any one of embodiments A, B, C, D, E, F or G, wherein a 50 wt % solution of the flow improver dissolved in xylene has a viscosity of less than or equal to about 20 (100 cp) at 4° C. when determined according to ASTM D2983, or an equivalent thereof.

I. The flow improver of any one of embodiments A, B, C, D, E, F, G or H, wherein a 25 wt % solution of the flow improver dissolved in xylene has a viscosity of less than or equal to about 4 cp at 4° C. when determined according to ASTM D2983, or an equivalent thereof.

J. The flow improver of any one of embodiments A, B, C, D, E, F, G, H, or I, wherein less than or equal to about 500 ppm of the flow improver at least partially dissolved in a hydrocarbon fluid having a wax appearance temperature, produces a reduction in cold finger deposition from the hydrocarbon fluid as compared to the cold finger deposition of an essentially identical hydrocarbon fluid determined under essentially identical conditions in the absence of the flow improver, wherein the cold finger deposition is determined with the hydrocarbon fluid above the wax appearance temperature and the cold finger temperature is below the wax appearance temperature of the hydrocarbon fluid.

K. The flow improver of embodiment J, wherein the reduction in cold finger deposition is greater than or equal to about 10 wt %.

L. The flow improver of any one of embodiments A, B, C, D, E, F, G, H, I, J, or K, wherein less than or equal to about 300 ppm of the flow improver at least partially dissolved in the hydrocarbon fluid produces a reduction in cold finger deposition from the hydrocarbon fluid as compared to the cold finger deposition of an essentially identical hydrocarbon fluid determined under essentially identical conditions in the absence of the flow improver.

M. The flow improver of any one of embodiments A, B, C, D, E, F, G, H, I, J, K, or L, wherein less than or equal to about 500 ppm of the flow improver at least partially dissolved in a hydrocarbon fluid produces a reduction in the pour point temperature of the hydrocarbon fluid as compared to the pour point temperature of an identical hydrocarbon fluid in the absence of the flow improver, wherein the pour point temperature is determined according to ASTM D97, or an equivalent thereof.

N. The flow improver of embodiment M, wherein the reduction in pour point temperature is greater than or equal to about 3° C.

O. The flow improver of any one of embodiments A, B, C, D, E, F, G, H, I, J, K, L, M, or N, wherein the flow improver comprises a mixture comprising a plurality of flow improvers, wherein a first portion of the plurality of branched dendritic cores is esterified with a different carboxylic acid moiety or substituted carboxylic acid moiety than a second portion of the plurality of branched dendritic cores.

P. A method of inhibiting the deposition of paraffin from a hydrocarbon fluid comprising adding an effective amount of a flow improver to the hydrocarbon fluid, wherein the flow improver comprises:

a branched dendritic core comprising a first quaternary carbon center bonded to four second carbon atoms, wherein at least three of the four second carbon atoms are individually bonded to one or more chain extender ligands to produce the branched dendritic core, wherein the branched dendritic core has greater than or equal to about 16 terminal hydroxyl groups, and wherein at least one of the terminal hydroxyl groups is esterified with at least one carboxylic acid moiety comprising from 6 to 30 carbon atoms, at least one substituted carboxylic acid moiety comprising from 6 to 30 carbon atoms, or a combination thereof, wherein the substituted carboxylic acid moiety comprises at least one functional group comprising elements from Groups 13 to 17 of the periodic table of the elements.

Q. The method of embodiment P, wherein the at least one carboxylic acid moiety or the substituted carboxylic acid moiety has from 12 to 22 carbon atoms.

R. The method of embodiment P or Q, wherein essentially all of the terminal hydroxyl groups are each individually esterified with a corresponding number carboxylic acid moieties, substituted carboxylic acid moieties, or a combination thereof, each having from 12 to 22 carbon atoms.

S. The method of any one of embodiments P, Q, or R, wherein a 50 wt % solution of the flow improver dissolved in xylene has a viscosity of less than or equal to about 20 cp at 4° C. when determined according to ASTM D2983, or an equivalent thereof.

T. The method of any one of embodiments P, Q, R, or S, wherein a 25 wt % solution of the flow improver dissolved in xylene has a viscosity of less than or equal to about 4 cp at 4° C. when determined according to ASTM D2983, or an equivalent thereof.

U. The method of any one of embodiments P, Q, R, S, or T, wherein less than or equal to about 500 ppm of the flow improver at least partially dissolved in the hydrocarbon fluid having a wax appearance temperature, produces a reduction in cold finger deposition from the hydrocarbon fluid as compared to the cold finger deposition of the hydrocarbon fluid determined under essentially identical conditions in the absence of the flow improver, where in the cold finger deposition is determined with the hydrocarbon fluid above the wax appearance temperature and the cold finger temperature is below the wax appearance temperature of the hydrocarbon fluid.

V. The method of embodiment U, wherein the reduction in cold finger deposition is greater than or equal to about 10 wt %.

W. The method of any one of embodiments P, Q, R, S, T, U, or V, wherein the flow improver comprises a mixture comprising a plurality of flow improvers, wherein a first portion of the plurality of branched dendritic cores is esterified with a different carboxylic acid moiety than a second portion of the plurality of branched dendritic cores.

X. The method of any one of embodiments P, Q, R, S, T, U, V, or W, wherein the flow improver is added to the hydrocarbon fluid as a solution having a concentration of greater than or equal to about 20 wt % of the flow improver dissolved in a solvent.

Y. A method of reducing the pour point temperature of a hydrocarbon fluid comprising the step of adding an effective amount of a flow improver to the hydrocarbon fluid, wherein the flow improver comprises:

a branched dendritic core comprising a first quaternary carbon center bonded to four second carbon atoms, wherein at least three of the four second carbon atoms are individually bonded to one or more chain extender ligands to produce the branched dendritic core, wherein the branched dendritic core has greater than or equal to about 16 terminal hydroxyl groups, and wherein at least one of the terminal hydroxyl groups is esterified with at least one carboxylic acid moiety comprising from 6 to 30 carbon atoms, at least one substituted carboxylic acid moiety comprising from 6 to 30 carbon atoms, or a combination thereof, wherein the substituted carboxylic acid moiety comprises at least one functional group comprising elements from Groups 13 to 17 of the periodic table of the elements, and wherein the pour point temperature is determined according to ASTM D97, or an equivalent thereof.

Z. The method of embodiment Y, wherein less than or equal to about 500 ppm of the flow improver at least partially dissolved in the hydrocarbon fluid produces a reduction in the pour point temperature of the hydrocarbon fluid as compared to the pour point temperature of the hydrocarbon fluid determined under essentially identical conditions in the absence of the flow improver, wherein the pour point temperature is determined according to ASTM D97, or an equivalent thereof.

Z1. The method of embodiment Z, wherein the reduction in pour point temperature is greater than or equal to about 3° C.

A1. Any one of embodiments A through Z1, wherein the hydrocarbon fluid is crude oil, a crude oil condensate, a middle distillate, a fuel oil, diesel, or a combination thereof.

B1 A method comprising: adding a flow improver to a first hydrocarbon fluid to produce a second hydrocarbon fluid, wherein the flow improver comprises any of the flow improvers of embodiments A through O.

C1 The method of embodiment B1, wherein the first hydrocarbon fluid is a hydrocarbon fluid produced during extraction of hydrocarbons from a well, crude oil, a crude oil condensate, a middle distillate, a fuel oil, diesel, or a combination thereof.

D1. The method of embodiment B1 or C1, wherein the at least one carboxylic acid moiety or the substituted carboxylic acid moiety has from 8 to 24 carbon atoms.

E1. The method of embodiment B1, C1, or D1, wherein essentially all of the terminal hydroxyl groups are each individually esterified with a corresponding number of carboxylic acid moieties, substituted carboxylic acid moieties, or a combination thereof, each having from 8 to 24 carbon atoms.

F1. The method of embodiment B1, C1, D1, or E1, wherein a 50 wt % solution of the flow improver dissolved in xylene has a viscosity of less than or equal to about 200 cp at 4° C. when determined according to ASTM D2983, or an equivalent thereof.

G1. The method of embodiment B1, C1, D1, E1, or F1, wherein a 25 wt % solution of the flow improver dissolved in xylene has a viscosity of less than or equal to about 100 cp at 4° C. when determined according to ASTM D2983, or an equivalent thereof.

H1. The method of embodiment B1, C1, D1, E1, F1, or G1, wherein the flow improver is added to the first hydrocarbon fluid as a solution having a concentration of greater than or equal to about 20 wt % of the flow improver dissolved in a solvent.

I1. The method of embodiment B1, C1, D1, E1, F1, G1, or H1, wherein a pour point temperature of the second hydrocarbon fluid is less than a pour point temperature of the first hydrocarbon fluid, wherein the pour point temperature determined according to ASTM D97, or an equivalent thereof.

J1. The method of embodiment B1, C1, D1, E1, F1, G1, H1, or I1, wherein the pour point temperature of the second hydrocarbon fluid is reduced by at least 3° C. as compared to the pour point temperature of the first hydrocarbon fluid.

K1. The method of embodiment B1, C1, D1, E1, F1, G1, H1, I1, or J1, wherein a wax appearance temperature of the first hydrocarbon fluid is higher than a wax appearance temperature of the second hydrocarbon fluid, wherein the wax appearance temperature is determined using variable temperature polarized visual light microscopy at an objective lens of 10×, and an optical lens of 10×.

L1. The method of embodiment B1, C1, D1, E1, F1, G1, H1, I, J1, or K1, wherein the wax appearance temperature of the second hydrocarbon fluid is reduced by at least 3° C. as compared to the wax appearance temperature of the first hydrocarbon fluid.

M1. The method of embodiment B1, C1, D1, E1, F1, G1, H1, I1, J1, K1, or L1, wherein the flow improver is present in the second hydrocarbon fluid at a concentration of less than or equal to 500 ppm.

N1. The method of embodiment B1, C1, D1, E1, F1, G1, H1, I1, J1, K1, L1, or M1, wherein the flow improver is present in the second hydrocarbon fluid at a concentration from 10 ppm to 500 ppm.

O1. A method comprising:
extracting a hydrocarbon fluid from a well and adding a flow improver to the hydrocarbon fluid, the flow improver comprising any of the flow improvers of embodiments A through O.

P1. The method according to embodiment O1, wherein the flow improver is added to the hydrocarbon fluid prior to the hydrocarbon fluid being extracted from the well.

Q1. The method according to embodiment O1 or P1, wherein the flow improver is added to the hydrocarbon fluid after the hydrocarbon fluid has been extracted from the well.

R1. The method according to embodiment O1, P1, or Q1, wherein the well is located underwater.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

We claim:
1. A method comprising:
adding a flow improver to a first hydrocarbon fluid to produce a second hydrocarbon fluid, wherein the flow improver comprises a dendrimer comprising a branched dendritic core comprising a first quaternary carbon center bonded to four second carbon atoms, wherein at least three of the four second carbon atoms are individually bonded to one or more chain extender ligands to produce the branched dendritic core, wherein the branched dendritic core has greater than or equal to about 16 terminal hydroxyl groups, and wherein at least one of the terminal hydroxyl groups is esterified with at least one carboxylic acid moiety comprising from 6 to 30 carbon atoms, at least one substituted carboxylic acid moiety comprising from 6 to 30 carbon atoms, or a combination thereof, wherein the substituted carboxylic acid moiety comprises at least one functional group comprising elements from Groups 13 to 17 of the periodic table of the elements.

2. The method of claim 1, wherein the first hydrocarbon fluid is a hydrocarbon fluid produced during extraction of hydrocarbons from a well, crude oil, a crude oil condensate, a middle distillate, a fuel oil, diesel, or a combination thereof.

3. The method of claim 1, wherein essentially all of the terminal hydroxyl groups are each individually esterified with a corresponding number of carboxylic acid moieties, substituted carboxylic acid moieties, or a combination thereof, each having from 8 to 24 carbon atoms.

4. The method of claim 1, wherein the flow improver is added to the first hydrocarbon fluid as a solution having a concentration of greater than or equal to about 20 wt % of the dendrimer dissolved in a solvent.

5. The method of claim 1 further comprising adding flow improver to the first hydrocarbon fluid in a well.

6. A method comprising:
extracting a hydrocarbon fluid from a well;
adding a flow improver to the hydrocarbon fluid, the flow improver comprising a dendrimer comprising a branched dendritic core comprising a first quaternary carbon center bonded to four second carbon atoms, wherein at least three of the four second carbon atoms are individually bonded to one or more chain extender ligands to produce the branched dendritic core, wherein the branched dendritic core has greater than or equal to about 16 terminal hydroxyl groups, and wherein at least one of the terminal hydroxyl groups is esterified with at least one carboxylic acid moiety comprising from 6 to 30 carbon atoms, at least one substituted carboxylic acid moiety comprising from 6 to 30 carbon atoms, or a combination thereof, wherein the substituted carboxylic acid moiety comprises at least one functional group comprising elements from Groups 13 to 17 of the periodic table of the elements.

7. The method of claim 6, wherein the flow improver is added to the hydrocarbon fluid prior to the hydrocarbon fluid being extracted from the well.

8. The method of claim 6, wherein the flow improver is added to the hydrocarbon fluid after the hydrocarbon fluid has been extracted from the well.

9. The method of claim 6, wherein the well is located underwater.

10. The method of claim 6, wherein the flow improver is added to the hydrocarbon fluid while the hydrocarbon fluid is extracted from the well.

* * * * *